United States Patent [19]

Willis et al.

[11] Patent Number: 5,550,998
[45] Date of Patent: Aug. 27, 1996

[54] PRE-SEEKING PROCESS FOR ENHANCING READING AND WRITING PERFORMANCE IN A MASS STORAGE SYSTEM HAVING MULTIPLE INDIVIDUAL DISK DRIVES

[75] Inventors: Daniel J. Willis, Arvada; Richard C. Cleavinger, Lafayette, both of Colo.

[73] Assignee: Storage Technology Corporation, Louisville, Colo.

[21] Appl. No.: 76,548

[22] Filed: Jun. 14, 1993

[51] Int. Cl.⁶ ................................................ G06F 12/00
[52] U.S. Cl. ........................ 395/441; 395/440; 395/464; 364/DIG. 1; 364/243.41; 364/263.1
[58] Field of Search ..................... 364/200 MS, 900 MS, 364/34; 395/440, 441, 464; 360/75

[56] References Cited

U.S. PATENT DOCUMENTS

| | | | |
|---|---|---|---|
| 4,075,686 | 2/1978 | Calle et al. | 395/465 |
| 5,005,089 | 4/1991 | Thanos et al. | 360/77.08 |
| 5,040,084 | 8/1991 | Liu | 360/77.04 |
| 5,133,060 | 7/1992 | Weber et al. | 395/440 |
| 5,274,799 | 12/1993 | Brant et al. | 395/182.04 |
| 5,293,608 | 3/1994 | Johnson et al. | 395/463 |
| 5,309,451 | 5/1994 | Noya et al. | 371/40.4 |
| 5,394,382 | 2/1995 | Hu et al. | 369/32 |
| 5,394,532 | 2/1995 | Belsan | 395/441 |
| 5,418,921 | 5/1995 | Cortney et al. | 395/441 |

*Primary Examiner*—Matthew M. Kim
*Attorney, Agent, or Firm*—John R. Ley; John B. Phillips

[57] ABSTRACT

A process, preferably executed by software in a RAID mass storage system, involves seeking a transducer of an individual disk drive of the mass storage system to a predetermined write pre-seek location at which the next write operation is expected to be performed, and selecting the transducer of that individual disk drive by which to perform the next write operation. By pre-seeking to the write pre-seeking location and by selecting the transducer in advance of receiving the next write command, the time required for seeking to the write location and selecting the transducer becomes less of a restriction on system I/O throughput. Write pre-seeking is achieved by recognizing the execution of a predetermined write algorithm from at least one write operation. Recognition of the write algorithm allows the location for the next write operation to be predicted. Read pre-seeking is also used. Read pre-seeking involves seeking the transducer to a location within an active area to which a predetermined number of read operations have previously occurred. By establishing the read pre-seek location within the active area which is less than the complete recording area of the disk drive, there is an increase probability that the time to seek the transducer to the actual read location will be minimized.

33 Claims, 5 Drawing Sheets

Fig_3

Fig_6

Fig_5

PRE-SEEKING PROCESS FOR ENHANCING READING AND WRITING PERFORMANCE IN A MASS STORAGE SYSTEM HAVING MULTIPLE INDIVIDUAL DISK DRIVES

The present invention relates to a new and improved process for improving performance in a mass storage system having multiple individual disk drives that are preferably arranged in a redundant array of independent disks (RAID) configuration. More particularly, the present invention relates to reducing the amount of time consumed in seeking and selecting heads when performing write and/or read operations, by pre-seeking to an anticipated optimal location and selecting read/write transducers on the individual disk drives during idle the time which typically occurs between read and write operations.

BACKGROUND OF THE INVENTION

RAID mass storage systems have recently been developed in an effort to reduce the cost of large, relatively-expensive and complex single disk mass storage systems, to increase the performance of the mass storage system by providing a better architecture of mass storage hardware to more efficiently service read and write commands from a host computer, and to increase error tolerance due to the redundancy and distribution of the information among multiple disk drives, among other reasons.

A typical RAID mass storage system architecture involves an array controller which receives input/output (I/O) commands and data from a host computer. The array controller distributes the I/O commands and data among a plurality of redundancy groups of relatively small, relatively inexpensive disk drives which are connected to the array controller. Each redundancy group includes a multiplicity of the disk drives. For example, a typical RAID system may include between two and six redundancy groups, and each redundancy group may typically contain between four and twenty individual disk drives.

Performance enhancements in a RAID system normally occur from evenly distributing or spreading the data across the disk drives in the redundancy groups. Distributing the data across multiple disk drives involves breaking the data up into relatively small segments and evenly spreading the relatively small sized data segments among the disk drives. A variety of different write algorithms can be employed for distributing the data across the redundancy groups. However, one of the consequences of evenly distributing the data is that any individual disk drive or redundancy group is usually not involved in a read or write operation for more than a limited percentage of time, for example, 30%. During the time when the disk drives and redundancy groups are not involved in a read or write operation, they are idle.

One of the limitations in I/O performance of RAID systems relates to the time required to position the head or transducer at a particular location on the disk to perform the read or write operation. The movement of the head to the desired location for a read or write operation is called "seeking". The amount of time to seek from one location to another location on a relatively small disk drive is very significant compared to the data rate at which data may be written or read after the head is in the appropriate location. Thus, seeking time can constitute an important limitation on the performance of an individual disk drive.

Another factor which constitutes a limitation on the performance of individual disk drives in a RAID system is the time to select a particular head for accomplishing the read and write operations. Selecting a head involves activating the multiplexer of the disk drive to direct the data to and from a particular head. A significant amount of time may be consumed in selecting the heads, particularly when the selection occurs between different disk drives.

It has been recognized that the performance of individual disk drives could be improved if the amount of time spent in seeking could be reduced. Efforts have been made to predict or anticipate the next location for read operations and to move or "pre-seek" the head to that location. The theory behind pre-seeking is that the head will be in a better position to perform the read operation by minimizing the seek delay time once the I/O command is delivered.

However, the theoretical recognition that pre-seeking can improve individual disk drive performance and the successfully implementation of pre-seeking, under conditions which has obtained significant performance improvements, is believed to have never occurred. It is believed that efforts at pre-seeking have previously resulted in the conclusion that previous pre-seeking techniques have generally not improved performance, compared to not pre-seeking by leaving the head in the location of the previous operation. To a significant extent, the failure to improve performance has resulted from an inability to predict accurately the appropriate head locations to which to pre-seek.

As far as is known, the prior efforts to develop pre-seeking techniques have been confined to read operations. Since a read operation applies to data which has been previously written on a disk, the fact that the data is written to the disk defines a limited set of variables which has the potential of providing a better environment in which to anticipate pre-seek locations. Write operations performed by individual disk drives, on the other hand, are typically completely random and largely unpredictable, thereby making the complexity of pre-seeking for write operations virtually impossible or very difficult to predict.

SUMMARY OF THE INVENTION

The improvements available from the present invention relate to a process for decreasing the time necessary to perform sequential read and write operations in a mass storage system having a plurality of disk drives to which the read and write operations are commanded. The present invention has particular utility in RAID mass storage systems using log structured file or other types of write algorithms in which the write operations do not occur in place and are distributed substantially uniformly among all of the redundancy groups. In such systems, by implication, the read operations will also be realitively uniformly distributed. Performance improvements occur from the present invention because the distribution of data allows time between subsequent read and write operations to be used to pre-seek the head or transducer of an idle disk drive to predetermined pre-seek write locations and pre-seek read locations to reduce the seek time for subsequent read or write operation, thereby improving performance.

In accordance with one aspect of the present invention, the process involves determining from at least one write operation a characteristic uniquely defining the execution of a predetermined write algorithm which defines a predetermined series of write operations used to write a block of data. In response to this determination and by using the predictability of the write algorithm, a transducer of an individual disk drive in which the next write operation of the predetermined series is to be performed is seeked to a predetermined write pre-seek location at which the next write operation is anticipated to be performed, after the performance of the previous write operation of the series and before the next write operation of the series is commanded. In this manner, the time necessary to seek the transducer to the predetermined location at which the next write operation of the series is expected to occur is accomplished between the sequential write operations of the series. The transducer is in position to immediately perform the write operation when the command to do so is received.

In conjunction with the write pre-seeking, the process of the present invention also involves selecting the transducer of the individual disk drive in which the next write operation of the predetermined series is expected to be performed, after the performance of the previous write operation of the series and before the next write operation of the series is commanded. By pre-selecting the transducer in this manner, the selection time is reduced or eliminated, again enhancing I/O throughput.

In accordance with another one of its aspects, the present invention relates to seeking the transducer of an individual disk drive to a predetermined read pre-seek location at which there is a probability that the distance from the read pre-seek location to the actual location of the next read operation is reduced. The predetermined read pre-seek location is established approximately midway within a predetermined range of active locations. The range of active locations is determined by the locations of a predetermined number of previously performed read operations. By establishing the read pre-seek location within the active range, the time to perform read operations is likely to be reduced under the probability that subsequent read operations are more likely to occur in the active range than at random locations on the disk.

In accordance with another aspect of the present invention, a determination is made from each previously performed read or write operation whether to seek the transducer to the predetermined write pre-seek location or the predetermined read pre-seek location, after the performance of the immediately previous operation of the series. This dynamic determination occurs on an operation by operation basis and is intended to avoid or reduce the occurrence of a circumstance where read pre-seeking or write pre-seeking might deter system performance by causing counterproductive excessive positioning of the transducer.

A variety of other aspects of the present invention and a more complete appreciation of the present invention and its scope can be obtained from reference to the accompanying drawings, which are briefly summarized below, to the following detailed description of a presently preferred embodiment of the invention, and to the appended claims.

DETAILED DESCRIPTION

Figure 1:
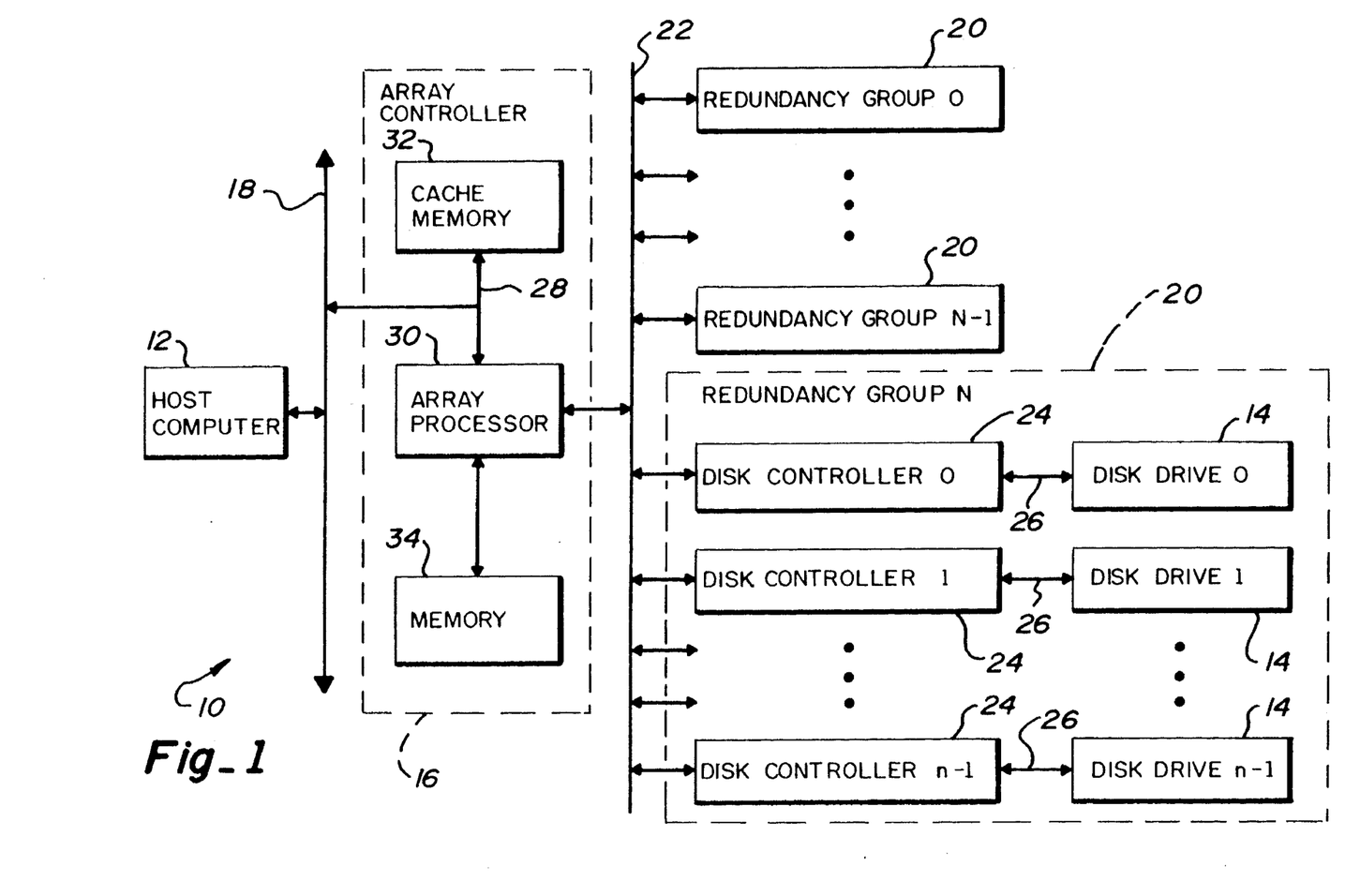
FIG. 1 is a block diagram of a typical RAID mass storage system connected to a host computer.

The present invention is advantageously incorporated in a RAID mass storage system 10 which is used in conjunction with a one or more host computers 12 as shown in FIG. 1. Although the present invention is believed to be most advantageously applicable to RAID mass storage systems 10, it is expected to have applicability in other types of mass storage systems in which a-plurality of disk drives 14 or a plurality of recording media and read/write transducers are employed.

The RAID mass storage system 10 includes an array controller 16 which is connected to the host computer 12 by a host bus 18. The array controller 16 is also connected to a plurality of redundancy groups 20. The number (N) of redundancy groups may be variable, but the advantages of a RAID mass storage system are more beneficially obtained by the use of two or more redundancy groups, thereby allowing the data to be spread among numerous redundancy groups. Also, by using a plurality of redundancy groups in this manner, the disk drives associated with each redundancy group experience increasing idle time during which read and write operations are not performed. It is during this idle time that the pre-seeking process of the present invention may be employed to significant advantage.

Each redundancy group 20 is connected to the array controller 16 by an array bus 22. It is over the bus 22 that read and write commands and the data to be read or written are transferred between each redundancy group 20 and the array controller 16.

Each redundancy group 20 includes a disk controller 24 connected to each disk drive 14. Each disk controller 24 is connected to the bus 22 and receives the data and the read and write commands addressed to it by the array controller 16. In response to the read and write commands, the addressed disk controller delivers control signals to the attached disk drive 14 to accomplish the read and write operations which are commanded by the array controller 16. In response to a read command from the disk controller 24, the attached disk drive 14 reads data previously written at the identified location on a rotating disk of the disk drive, and this data is supplied by the disk controller on the bus 22 to the array controller 16. The array controller normally supplies the data to the host bus 18 where is is received by the host computer 12. In response to a write command from the disk controller 24, the attached disk drive 14 writes the data supplied on the bus 22 by the array controller 16 to specific addressed locations on a rotating disk of the disk drive. The data written during a write operation has usually been previously supplied by the host computer 12 to the array controller 16.

The array controller 16 includes an internal bus 28 which is connected to an array processor 30 and to a cache memory 32. The array processor 30 is connected to a memory 32 which includes the programming for the processor 30 to obtain the various functional aspects of the array controller.

One of the functional aspects of the array controller 16 is to correlate I/O commands and the data from the host computer 12 with the physical locations of where the data is to be read or written in the RAID system 10. Typically this correlation function is achieved by use of a mapping table which associates the I/O commands from the host computer 12 to the redundancy groups, the disk drives and the locations on the disks of the disk drives where the data is to be written or read. This mapping algorithm is particulary useful if the RAID system is emulating another type of mass storage system. The mapping algorithm is dynamic in the sense that the mapping table is continually updated to reflect information concerning each new block of data which is written and to reflect memory locations which are invalid due to the data therein having been read, modified and recorded at another location.

Another one of the functional aspects of the array controller 16 is to check the cache memory 32 to attempt to fulfill I/O read/write operations from the host computer 12. If the information sought to be read is within the cache memory 32, a read operation is directed to the cache memory 32 and not to the disk drives 14 of the redundancy groups 20. Recent trends toward reduced prices of random access memory, from which the cache memory 32 is formed, have resulted in the use of larger sized cache memories. With the increased size of the cache memories comes a reduced probability that the array controller 16 will be required to read data from the redundancy groups 20, because it is more likely that the cache memory 32 will contain the data requested from the host computer 12. Consequently, an increasing proportion of the read/write operations commanded by the array controller 16 to the redundancy groups 20 are write operations. The increased ratio of write operations to read operations may reduce the performance of RAID mass storage systems, and the present invention is intended to ameliorate some of that adverse affect.

A further functional aspect of the array controller 16 is to implement a write algorithm for ordering and delivering write commands and data to the redundancy groups and to the disk drives where the data will be written to the disks at the locations addressed by the I/O commands. A wide variety of different types of write algorithms may be employed for this purpose. In general the write algorithm involves writing data as a block formed of a number of relatively small sized data segments. The data segments which form the block are spread over a number of disk drives of a redundancy group. A queue of read/write commands is developed to write the block of data. The read/write commands of the queue are executed in sequence and delivered to the disk drives in accordance with the write algorithm. Each disk controller 24 responds to the write commands from the array controller 16 to cause its attached disk drive to write the segment of data addressed to it.

Figure 2:
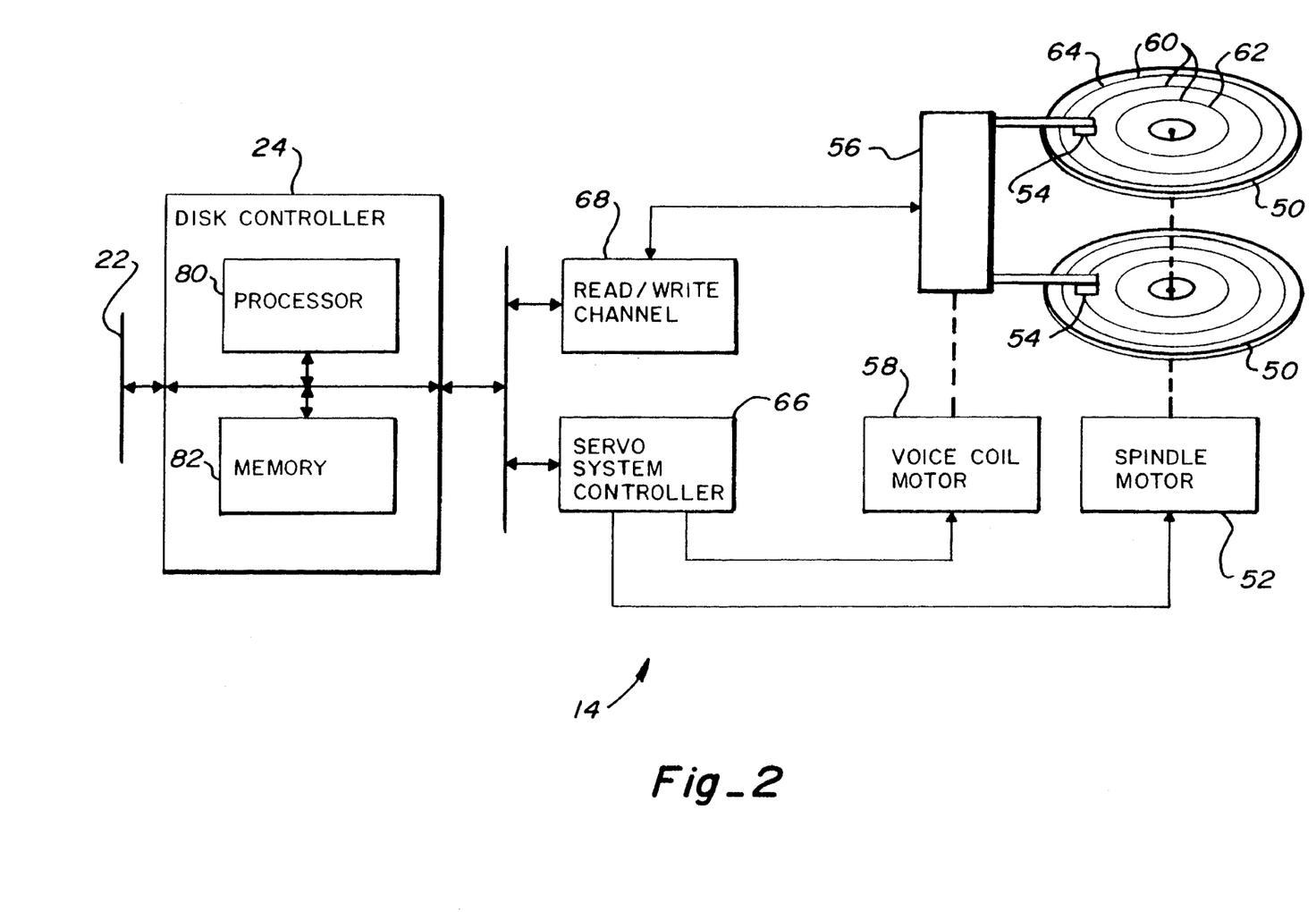
FIG. 2 is a generalized schematic illustration of one of the individual disk drives incorporated in each redundancy group of the RAID system shown in FIG. 1.

More details concerning each disk drive 14 are shown in FIG. 2. Each disk drive 14 includes at least one, and usually a considerably greater number of magnetic disks 50 or platters which are rotated at an essentially constant fixed rate by a spindle motor 52. Data is written to or read from the magnetic disks 50 by a transducer or read/write head 54. The head 54 is connected to an actuator 56 which is moved by a voice coil motor 58 to position the head 54 above different locations on the rotating disks 50.

The data is written on the disks 50 by magnetic characters induced into the magnetic surface of the disks 50 by signals applied to the heads 54. The magnetic characters are recorded in concentric curvi-linear tracks 60 described by the rotation of the disks when the heads 54 are located in a stationary location. These concentric tracks 60 extend from a track 62 at an inner diameter of the magnetic recording surface of the disk to an outer diameter track 64. Typically, there are a large number of tracks 60 recorded on each disk 50, for example 2,000. Each track has its own track number, usually starting with the inner diameter track 62 and extending to the outer diameter track 64.

Each disk drive 14 also includes a servo system controller 66. The servo system controller 66 supplies control signals to the voice coil motor 58 and the spindle motor 52. The control signals to the voice coil motor 58 move the actuator 56 to position the heads 54 at a predetermined track for reading preexisting data from the track or for writing data to the selected track. The control signals supplied to the spindle motor 52 maintain a desired rotational rate of the disks 60.

Each disk drive 14 also includes a read/write channel 68. The read/write channel 68 accomplishes a write operation by applying signals from the disk controller 24 to the head 54. The signals applied to the head 54 induce the magnetic characters into the disks 50 in the tracks 60 to record the data. In a read operation, the read/write channel 68 is adapted to receive the signals induced in the heads 54 by the magnetic characters in the tracks 60. The disk controller 24 receives the signals read, conditions them and applies them to the array bus 22.

In order to accomplish successful read/write operations, the position of the head 54 is coordinated while adapting the read/write channel 68 to perform the read operation or the write operation. The time required to move the head 54 from one track to the desired track at which a read or a write operation is to be performed is referred to as the seek time. The time required to adapt the read/write channel 68 to perform the read or write operation is called the selection time. The selection time is that finite amount of time required to activate the necessary electronic components within the read/write channel 68 to perform the read/write operation.

A variety of other types of configurations of RAID and other mass storage systems using multiple disk drives are known. The present invention may be implemented on a many other types of systems, other than that described as the preferred example.

The improvements of the present invention all relate to pre-seeking or pre-locating the head 54 in order to reduce the amount of time necessary to seek the head 54 to the appropriate track 60 to accomplish a desired read or write operation. In addition, the improvements of the present invention also relate to pre-selecting the heads 54 by which to accomplish the read or write operation. By both pre-seeking and pre-selecting, the amount of time consumed by such operations is diminished. The result is that the read/write operations commanded by the array controller are more rapidly executed. I/O throughput is increased and the performance of the host computer 12 (FIG. 1) is enhanced.

The pre-seeking and pre-selecting aspects of the present invention are preferably implemented in the disk controllers 24 of the disk drives. The disk controller includes a micro controller or microprocessor, referred to as a processor 80, to which there is attached a memory 82. The processor 80 and memory 82 form a computer of the disk controller 24 by which to implement the pre-seeking and pre-selection process of the present invention, preferably by software contained in the memory 82 and executed by the processor 80. Alternatively the present invention may also be implemented by software executed in another computer associated with either the array controller 16 or host computer 12 (FIG. 1).

Figure 3:
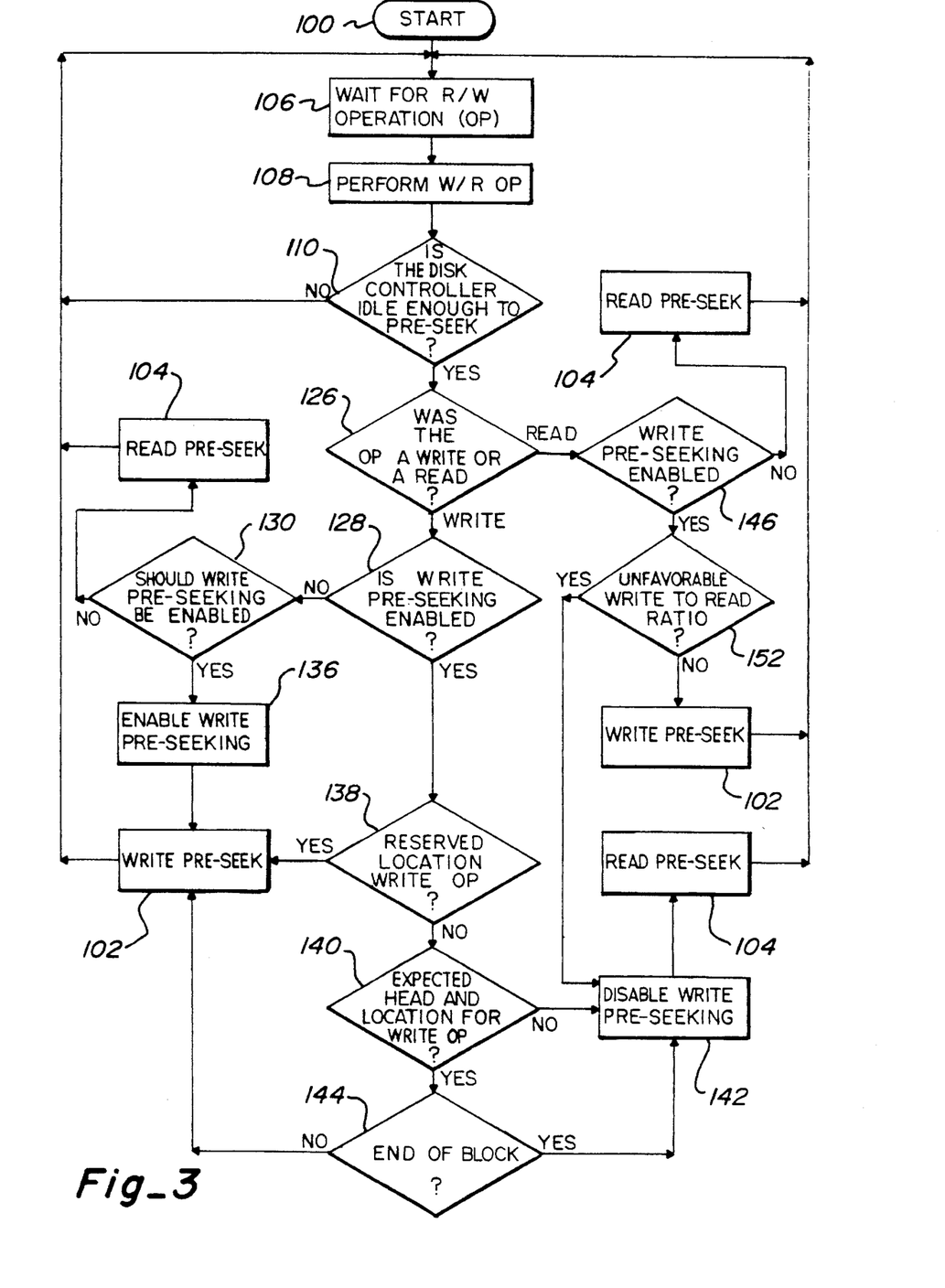
FIG. 3 is a flow chart illustrating the process of the present invention when used in conjunction with a RAID system shown in FIGS. 1 and 2.

The most significant steps of a presently preferred embodiment of the process of the present invention, as executed in software, are shown by the flow chart of FIG. 3. For convenience in describing the flow chart of FIG. 3, each individual step is referenced by a separate reference number.

The pre-seeking and pre-selecting process of the present invention begins at a start step 100. The objectives obtained by executing the process of the present invention are to write pre-seek, as shown as step 102, and/or to read pre-seek, as shown at step 104.

The write pre-seek step 102 involves locating the head 54 over the track 60 (FIG. 2) to which it is anticipated that data will be written on the next subsequent write operation commanded and selecting the anticipated head by which to write the data. By both pre-seeking and pre-selecting during a write pre-seek step 102, the time ordinarily consumed by these activities is greatly reduced or eliminated, because the pre-seeking and pre-selecting activities will occur during the idle time between sequential write commands to the same redundancy group.

Normally there will be sufficient idle time between sequential write commands to accomplish write pre-seeking. Read commands are normally given priority over the write commands by the array controller so as not to inhibit the performance of the host computer 12 by causing it to wait unnecessarily for data requested to perform its operations. In addition, each disk drive in a multiple disk drive system, such as a RAID system, usually experiences a considerable amount of idle time. Since the write operations are uniformly distributed throughout all of the redundancy groups and disk drives, the read operations will also be uniformly distributed, on the average, because the read operations usually follow the uniform distribution of the written data. With a larger number of disk drives, there is a increasing probability that each disk drive will experience more idle time because the larger number of disk drives to which each read or write operation decreases the probability that any one disk drive will be active and correspondingly increases the probability that any one disk drive will be active. Furthermore, the host computer is incapable of generating I/O commands at such a high rate that a significant number of disk drives will be occupied in servicing those commands. Further still, the larger cache memories increse the probability that a host computer I/O command will be serviced from the cache memory, thus increasing the idle time experienced by the disk drives. Consequentially in a multiple disk drive mass storage system, such as a RAID system, there will be idle time normally available in each redundancy group by which to accomplish the pre-seeking and pre-selecting during a write pre-seek step 102.

In order to effectively implement a write pre-seek step, it is necessary to have a prior appreciation for the predetermined sequence of steps by which a block of data is written. This predetermined sequence is described by the write algorithm executed by the array controller 16 (FIG. 1). In the preferred embodiment, and that chosen as an example for illustrating the present invention, the write algorithm is a log structured file algorithm in which each block of data is written to a logical cylinder on each redundancy group. A logical cylinder is defined by the same numbered tracks 60 of each disk 50 of all of the disk drives 14 within each redundancy group 20. The block of data is written to the logical cylinder starting with the first head of the first disk drive of the redundancy group and moving sequentially through all of the heads of all of the disk drives of the redundancy group until the last head of the last disk drive of the group writes data to the last track of the logical cylinder. Each track of the logical cylinder is completely written. When the last track of the logical cylinder of the last disk drive of the redundancy group has been written, writing of the logical cylinder is completed. Upon completely writing one logical cylinder, the write algorithm is complete for one block of data. Different types of write algorithms may be employed other than that one described herein as an example.

It is important that the write algorithm be capable of recognition by the disk controller 24 of each disk drive 14, so as to enable a recognition of the institution and progress of the queued commands for writing a block of data. More details concerning the write algorithm chosen to exemplify the present invention will be apparent during the description of the flow chart shown in FIG. 3.

The read pre-seek step 104 involves positioning the heads 54 to a predetermined location or track on those redundancy groups where write operations are not occurring to reduce the amount of time necessary to seek from the predetermined read pre-seek location to the actual track where a read operation is commanded. It is typical that prior disk drives provide read pre-seeking by locating the heads in the middle of the tracks 60 between the inner track 62 and the outer track 64 (FIG. 2). Positioned in this manner, the head has an equal probability of moving in either direction to the addressed track for accomplishing the read operation. This read pre-seek location provides approximately the best probability that the time to seek to the actual read location will be diminished.

In addition and in accordance with another improvement of the present invention, the heads may be positioned in approximately the middle of an active range of tracks during which a predetermined number of previous read operations have been commanded. Usually the active range will be a limited portion of the whole magnetic recording surface area of the disk, rather than the complete area between the inner track 62 and the outer track 64. By positioning the heads in the middle of the active range, the amount of time to seek from the read pre-seek location to the actual track location for the read operation is further diminished, under the probable expectation that subsequent read commands will return to a particular active range. By pre-seeking to the active range rather than to the middle of the whole recording area, further reductions in seek time during read operations are expected to be realized. However, it should be understood that either read pre-seeking to the middle of the whole magnetic surface area or to the middle of the active area are encompassed by the broader aspects of the read pre-seek step 104.

After the start step 100, the next step 106 involves waiting for a read/write operation (OP). The read/write operation will be delivered by the array controller 16 over the bus 22 to a disk controller 24 (FIG. 1). The read/write operation is performed at step 108.

A determination is then made at step 110 of whether the disk controller is idle enough to pre-seek. This step 110 involves determining whether the disk controller 24 (FIG. 1) consumes most of its time in idle nonactivity. The disk controller should be idle most of the time for the pre-seeking aspects of the present invention to improve computer system performance by decreasing the average time of read or write operations. If the disk controller is too busy, then it is more likely that the disk controller will be performing the operations associated with pre-seeking at the time it receives a read or write command from the array controller 16 (FIG. 1), resulting in "thrashing".

Thrashing describes the excessive movement of the heads and the increased time delay in accomplishing an operation resulting from pre-seeking interfering with the normal execution of a read/write command. Once a pre-seeking operation is started, seeking to the pre-seek location must be completed before further seeking is possible. If a read/write command is received while the pre-seeking operation is underway, seeking for the commanded read/write operation can only begin after the pre-seek location has been achieved. In this situation, two seeks are required to finally achieve the location of the commanded read/write operation, one to the pre-seek location and the other to the commanded read/write location. Excessive movement of the heads results. In addition, additional delay time is encountered since the pre-seek operation must be completed before the commanded read/write operation can be accomplished. In a worst case situation, thrashing can result in twice the amount of head movement and twice the seek time to accomplish the commanded read/write operation. Thrashing degrades system performance because the delays of associated with pre-seeking in situations where there a large number of read/write commands to the disk drives where pre-seeking is directed.

Whether or not to pre-seek is determined by the activity associated with the disk controller 24 (FIG. 1). A high amount of activity by executing read/write commands will usually indicate that pre-seeking should be avoided. A low amount of activity, or at least activity below a predetermined threshold, will usually indicate a benefit to be obtained by pre-seeking. In general, the determination of whether the disk controller is idle enough to pre-seek at step 110 involves timing the intervals between a sequential number of read and write operations, averaging the times for a predetermined number of the last sequential operations and comparing the average to a threshold. If the average is greater than the threshold, indicating a higher amount of activity, pre-seeking is abandoned. If the average is less than the threshold, indicating a lower amount of activity, pre-seeking is enabled.

Figure 4:
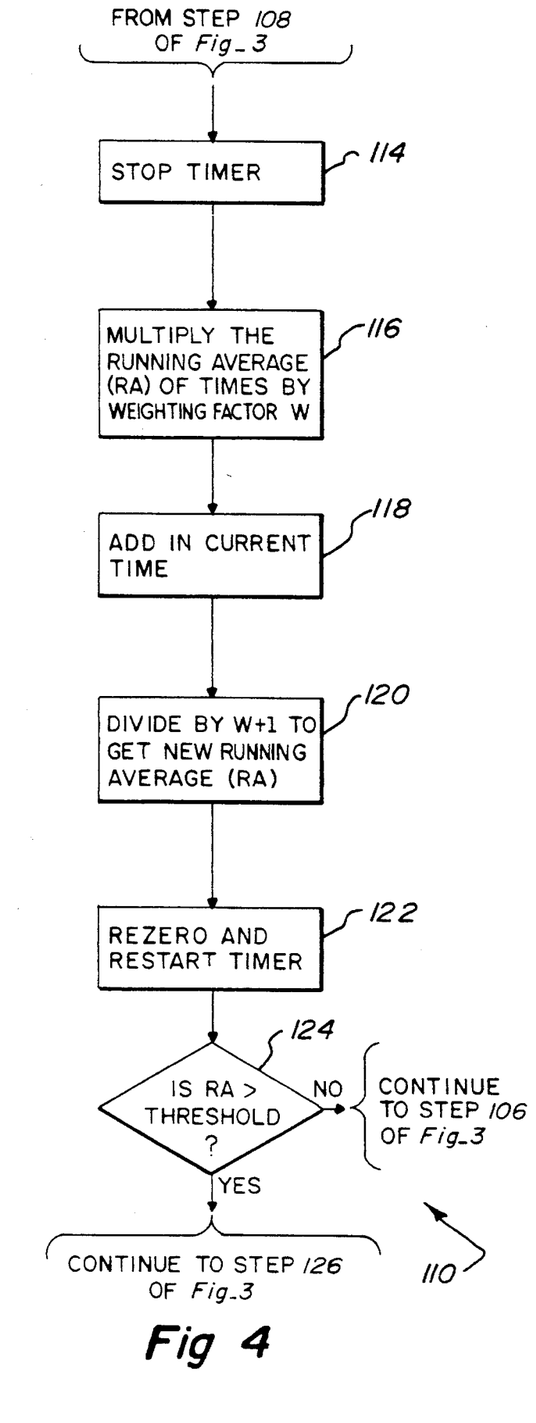
FIG. 4 is a flow chart of further aspects of the process step shown in FIG. 3, "Is the disk controller idle enough to pre-seek?"

FIG. 4 shows the specific steps involved in executing the more general step 110 shown in FIG. 3. Referring to FIG. 4, the step 110 is commenced immediately after performing the read or write operation 108 (FIG. 3). A timer is stopped as shown in step 114 after performing the previous read or write operations. The running average (RA) of times between prior commands is then multiplied by a weighing factor (W) as shown at step 116. The weighing factor relates in general to the number of prior read or write operations over which it is desired that the average be determined. Thereafter at step 118, the current time between the last two read or write operations is added in. The current time is determined as a result of stopping the timer at step 114. At step 120, the total time resulting from the addition at step 118 is divided by (W+1) to obtain a new running average (RA). The division by (W+1) accounts for the most recent time interval. At step 122, the timer associated is again started to time the interval until the occurrence of the next sequential read/write command at step 114.

At step 124, the running average (RA) is compared to a predetermined selected threshold value. The predetermined selected threshold value may be determined empirically based on evaluations of system performance, and/or is selected by the user. For example, it may be determined that the threshold time limit between sequential read/write commands is such that if the disk controller is busy more than 50% of the time, improvements in system performance will not result from pre-seeking. Of course, the running average (RA) of time must be correlated to the actual times and frequency of read/write operations in order to evaluate the percentage activity.

If at step 124 it is determined that the running average is less than the threshold, this is an indication that the sequential read or write operations are occurring too frequently to obtain the benefits of pre-seeking. In this case, the determination made at step 124 will result in continuing the process of FIG. 3 to the step 106.

On the other hand, if the determination made at step 124 is that the running average is greater than the threshold, there is an indication that the time between sequential read or write operations exceeds the threshold limit, and this indicates that enough time is available to obtain improvements in performance by pre-seeking. In this case, the sequence continues to step 126 as shown in FIG. 3.

Referring to FIG. 3 at step 126, a determination is made whether the operation performed at step 108 was a read operation or a write operation. The performance of a read operation or a write operation will result in evaluating different conditions to determine whether to enable or to continue write pre-seeking. If write pre-seeking is not enabled or continued, read pre-seeking will continue. By determining whether to enable or continue write pre-seeking after the execution of each separate read or write operation, the potential for degrading system performance by continuing write pre-seeking in the situation of adverse read or write command conditions is avoided. Thus, a dynamic selection of write pre-seeking capability is achieved on an operation-by-operation basis, and the dynamic selection capability is intended to avoid a situation where write pre-seeking would actually degrade performance.

Write operations cause process flow to continue from step 126 to step 128. Step 128 involves determining whether write pre-seeking has been enabled. This step is accomplished by simply recognizing whether or not a flag has been set in software indicating that write pre-seeking has been enabled. Setting the flag to enable write pre-seeking is accomplished at step 130. Upon initialization of the system, the default condition is that write pre-seeking will not be enabled. Therefore, upon first encountering the determination at step 128, after initialization, write pre-seeking will not be enabled and the process flow will move to step 130.

Step 130 involves a determination of whether write pre-seeking should be enabled, based on recognition of the write algorithm from the write operation or operations previously executed at step 108. Upon recognition of the pattern of write operations which describe the write algorithm, write pre-seeking will be enabled. By enabling the write pre-seeking, seeking the heads to the desired location for performing the write command will occur, and selection of the head for performing the write command will also occur, during the normally inactive idle time between sequential commands from the array controller. As a result, system performance will improve by decreasing the seeking time and decreasing the selection time necessary to execute read and write operations after the operations have been commanded.

As an example of the write algorithm described herein, a logical cylinder on each of the disk drives of each redundancy group is opened, and thereafter a block of data is written to the complete logical cylinder. The writing starts with the first head of the first disk drive which writes the first track of the logical cylinder, head 0, and proceeds in order through the last head of the disk drive which writes the last track of the logical cylinder.

Figure 5:
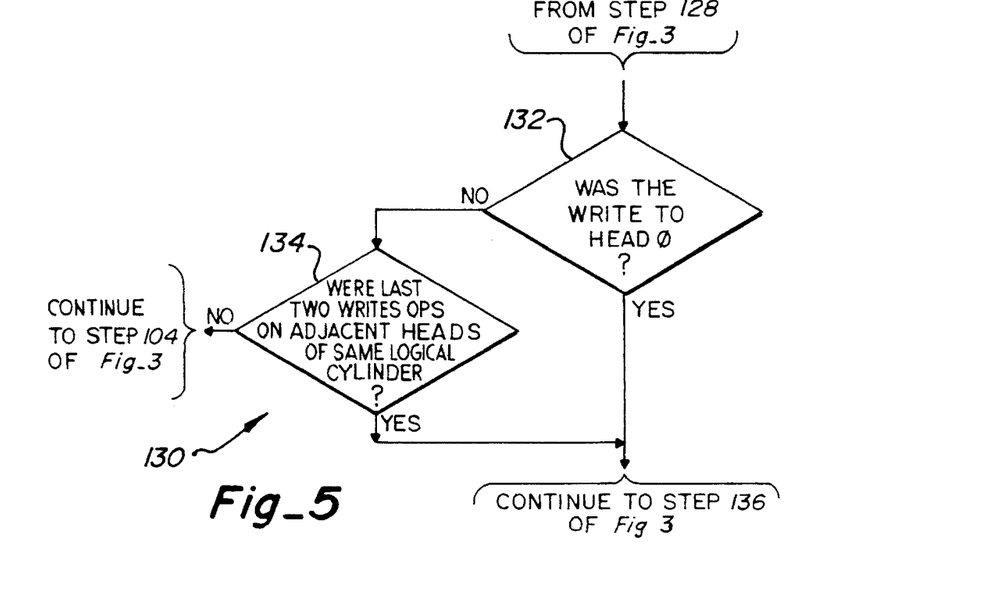
FIG. 5 is a flow chart of further aspects of the process step shown in FIG. 3, "Should write pre-seeking be enabled?"

This exemplary write algorithm can be detected using the steps shown in FIG. 5 which describe the process flow associated with the more general step 130 shown in FIG. 3.

Referring to FIG. 5, a determination is first made at step 132 whether the write operation (determined at steps 108 and 126, FIG. 3) was to head 0. If the write operation was to head 0, then in accordance with the write algorithm it is reasonably anticipated that a logical cylinder has been opened for writing a block of data thereto. Therefore, the disk controller 24 can reasonably anticipate that there will be a series of write commands occurring in regular order to write the block of data in the logical cylinder. Thus, the determination at step 132 that the write command was to head 0 will accomplish step 130 and result in continuation of the process flow to step 136 of FIG. 3.

However, if the write command was not to head 0, it does not necessarily mean that the array controller is not executing the write algorithm. Thus, a second determination is necessary. At step 134 a determination is made whether the last two write operations occurred on adjacent heads of the same logical cylinder. The determination step 134 is useful in enabling write pre-seeking if, for example, a burst of activity associated with the disk controller either caused the running average (FIG. 4) to exceed the threshold at step 110 during the middle of writing the logical cylinder, and it was only after this burst of activity that the performance enhancements from write pre-seeking would be advantageous. Thus, an affirmative determination at step 134 would enable write pre-seeking and the process flow would continue to step 136 (FIG. 3). However, a negative determination at step 134 causes the process flow to continue the read pre-seeking step 104 (FIG. 3). Notice that even if write pre-seeking is not enabled by continuing to step 136, read pre-seeking will still be obtained to achieve operational improvements.

Referring back to FIG. 3, a negative determination at step 130 results in establishing read pre-seeking at step 104. The affirmative determination at step 130 results in enabling write pre-seeking at step 136. The step 136 of enabling write pre-seeking is accomplished by setting a flag in software. This flag will thereafter be recognized to cause the write pre-seek functionality associated with step 102 to be performed. After either write pre-seeking at step 102 or read pre-seeking at step 104, the process flow reverts back to step 106 to wait for the next read or write operation.

As a result of setting the enabling write pre-seeking at step 136, the next execution of the steps of the process flow from the step 106 to step 128 will result in a determination at step 128 that write pre-seeking has been enabled.

The step 138 determines whether a write operation performed at step 108 when write pre-seeking is enabled is a write operation directed to a reserved logical cylinder. In each redundancy group, a certain number of logical cylinders are reserved for control information. In general, this control information contains the mapping table information used by the array controller 16 (FIG. 1) to map the host computer I/O commands and data to the specific locations in the redundancy groups of the RAID mass storage system 10. Occasionally, this information in the reserved logical cylinders is updated by write commands delivered from the array controller. In those circumstances, the normal write operation associated with normal, non-reserved I/O commands will be interrupted, but it is expected that the normal I/O operations will resume immediately after the reserved logical cylinder has been written. For that reason, if it is determined at step 138 that a write operation is to a reserved cylinder, the write pre-seeking operational capability is continued at step 102. On the other hand, if the determination is made at step 138 that the write operation is not to a reserved cylinder, thereby indicating that the write operation is to a non-reserved logical cylinder in which normal I/O operations occur, the process flow continues to step 140.

Step 140 involves a determination of whether the write operation performed at step 108 was to the expected cylinder and head in accordance with the write algorithm. In order to make the determination at step 140, the logical cylinder and head at which each write operation is performed at step 108 is recognized and compared to that expected in accordance to the write algorithm.

If it is determined that the write operation is not to the expected cylinder or to the expected head in accordance with the write algorithm, write pre-seeking is disabled at step 142. To disable write pre-seeking at step 142, the flag indicating write pre-seeking is reset or removed.

On the other hand, if the write operation is determined at step 140 to be at the expected cylinder and expected head in accordance with the write algorithm, a further determination is made at step 144 as to whether the write operation is the last one transferring the block of data.

The end of a block of data, in the write algorithm example used for illustrating the present invention, is the last write operation by the last head of the last disk drive of the redundancy group to the last track of the logical cylinder. Thus, the step at 144 detects the last write operation in those involved in writing the block of data. When the last write operation at the end of the transferred block of data has occurred, the process flow progresses from step 144 to step 142 at which point the write pre-seeking is disabled. Write pre-seeking is disabled at step 142 because all of the block of data, e.g., a logical cylinder full of data, has been written. At this point there is no further basis by which to anticipate whether the next operation from the array controller will be a write operation or a read operation, or even if the next operation is a write operation, where it will be directed. Thus, the step 142 disables write pre-seeking but read pre-seeking remains active at step 104. The process flow thus reverts back to step 106 in preparation of the next operation.

On the other hand, if the determination at step 144 indicates that the most recent write operation is not the last operation involved in writing the end of a block of data, thereby signifying further write operations are probable in accordance with the write algorithm, a process flow continues to step 102. Write pre-seeking remains enabled at step 102 and process flow continues at step 106.

After the performance of each operation at step 108, the determination of a read operation at step 126 results in a transition to step 146. Step 146 is a determination of whether write pre-seeking is enabled. This determination is made by checking for the flag set at step 136. If write pre-seeking is not enabled, read pre-seeking at step 104 is accomplished and the process flow returns to step 106. If write pre-seeking is enabled, the process flow continues to step 152.

A determination is made at step 152 regarding the ratio of write operations to read operations occurring over a previous predetermined number of read or write operations. If during the course of writing a block of data to a logical cylinder, a number of read operations are commanded such that system performance degrades as a result of attempting to pre-seek to the write location only to have to seek to a different location to read, thrashing will result and it will deter system performance. In general, it is the determination made at step 152 which avoids such thrashing and the resulting system performance detriment by evaluating the ratio of write operations to the read operations.

Figure 6:
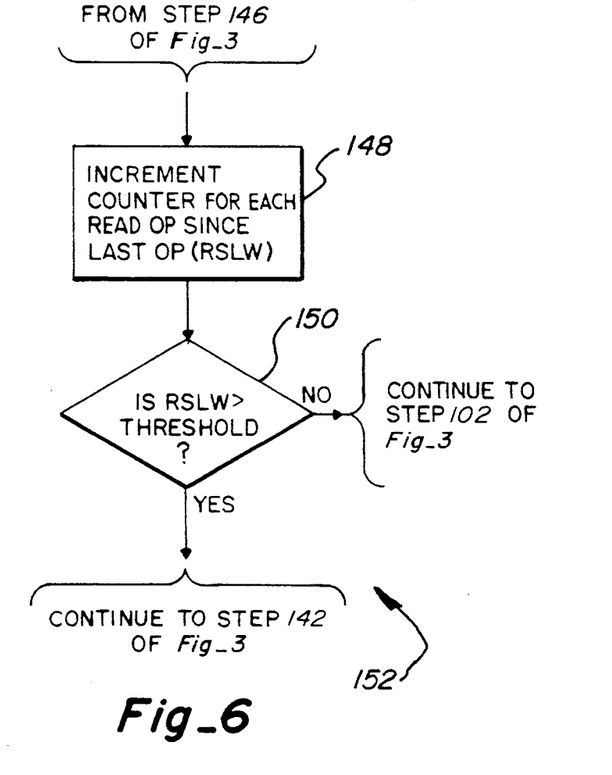
FIG. 6 is a flow chart of further aspects of the process step shown in FIG. 3, "Unfavorable write to read ratio?"

The more specific steps involved in evaluating the write-read ratio to make the determination at step 152 are shown in FIG. 6. The first step 148 involves incrementing a counter which counts the number of read operations since the last write operation. The count (RSLW) describes the number of read operations since the last write operation. The RSLW count is compared to a predetermined threshold at step 150. The threshold involved in step 150 is selected or established to determine the point at which the ratio of read operations to write operations becomes so unfavorable that system performance is degraded by continuing to enable write pre-seeking. If the RSLW count is greater than the threshold, signifying that the number of read operations is sufficiently great to degrade system performance, write pre-seeking will be disabled at step 142 (FIG. 3) and only read pre-seeking at step 104 (FIG. 3) will be utilized. Write pre-seeking will be disabled until the ratio of write operations to read operations becomes favorable as determined at step 150. Thus, an affirmative determination at step 150 will enable read pre-seeking at step 104 and write pre-seeking will be disabled at step 142. On the other hand, if the RSLW is below the threshold as determined at step 150, signifying that the ratio of write operations to read operations is still favorable enough to enhance system performance, write pre-seeking remains enabled as the process flow continues to step 152.

Although the write algorithm of a log structured file algorithm for writing complete tracks of a logical cylinder in sequence from the first head to the last head has been described for purposes of the preferred embodiment of the present invention and as an example of a write algorithm, other types of write algorithms may be used. In the case of other types of write algorithms not involving reserved cylinders, the step at 138 as shown in FIG. 3 may be eliminated. Further still, in circumstances where it is determined that it is unnecessary or undesirable to make the determination at steps 146 and 152, those steps may be eliminated. In their place a single step which determines whether write pre-seeking is enabled is employed. If write pre-seeking is enabled, the process flow would continue the write pre-seeking and return to step 106. If write pre-seeking is not enabled, the process flow would provide read pre-seeking and then return to step 106. Of course, using write algorithms other than the exemplary one described in detail above, may require additional steps to accomplish further determinations and control functions similar to those accomplished by steps 138, 146 and 152.

As previously noted, one known type of read pre-seeking involves moving the heads to the middle of the tracks between the inner track 62 and outer track 64 (FIG. 2). This pre-seek location is achieved after every read operation. The midpoint is selected under the theory that on the average, the seek time to the specified track to be read will be reduced if the starting point is no further away than when half the maximum total distance.

A new pre-seeking process according to the present invention identifies a subpart of the total area or number of tracks on a disk during which activity occurred over a prior limited number of read/write operations. Pre-seeking to that location is accomplished for read operations. This limited area is referred to as an active area or active range. By identifying the active area addressed by a predetermined number of previous read operations, the head is positioned at a predetermined read pre-seek location generally at the midpoint of the active area. In general, the theory behind this active-area, read pre-seek process is that a subsequent read operation is more probably commanded to a track within the active area than to a track outside of the active area. Consequently, by positioning the head at the midpoint of the active area, the distance and hence time necessary to seek the head to the desired track location within the active area will be diminished or reduced. The reduction in seek time will be greater than that obtained by the generalized full track read pre-seeking previously employed.

Figure 7:
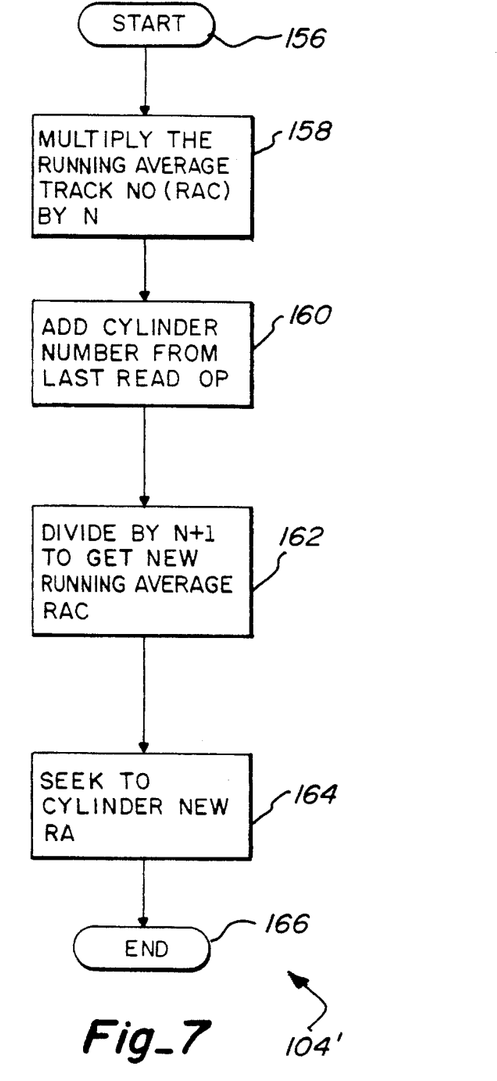
FIG. 7 is a flow chart of the steps involved in one technique for determining a pre-seek location of a transducer when read pre-seeking in the process shown in FIG. 3.

FIG. 7 shows is an example 104' of read pre-seeking to an active area, which may be employed as one desirable alternative in the step 104 (FIG. 3).

The embodiment of the read pre-seeking process 104' shown in FIG. 7 commences with a start step 156. The next step 158 involves multiplying the running average cylinder number (RAC) by N. The running average cylinder number (RAC) is the average of the track numbers of a predetermined number (N) of preceding consecutive read operations to logical cylinders. Each logical cylinder is described by the same track number on all the disk drives of a redundancy group, so the track number and the cylinder number are synonymous. The next step 160 involves adding to the product obtained at step 158, the cylinder number from the last read operation. The next step at 162 involves dividing the total obtained at step 160 by (N+1) to obtain a new running average cylinder number (RA). At step 164, the head is moved to the cylinder number of the new running average (RAC). This location is of course the average of the cylinder numbers over the predetermined previous sequential number (N+1) of read operations. Since this location is the average cylinder number of the previous N read operation locations, there is a theoretical possibility that sequential reads will occur in a more centrally located position relative to the new running average cylinder number. Therefore the seek time from the new running average cylinder number position to the cylinder location addressed in the next read command will be diminished. By achieving the read pre-seek location within the active area as determined by the running average cylinder number of a predetermined number (N+1) of previous read operations, the read pre-seek location is located in an area or range which is probably active for subsequent read operations. The read pre-seek process 104' is ended at step 166.

The calculation of two examples of anticipated system performance enhancements by reducing the time involved in seeking for write operations and by selecting the appropriate head for write operations in a RAID mass storage system using the logical cylinder log structured file write algorithm described above are set forth below. The information contained in these examples is that in which has been anticipated based on a worse case analysis under the assumptions as set forth in each example.

EXAMPLE 1

The calculated improvements in this Example 1 have been based on the following assumptions for a RAID mass storage system: the number of disk heads in each redundancy group is 16; the number of redundancy groups is 4; the average seek time is 13.5 ms; the optimized seek time is 12 ms (from the center cylinder to a random point); the head switch select time is 8ms; and the read/write ratio is assumed to be 2.75/6.2.

The first step in calculating the performance improvement is to calculate the total read operations and write operations from the read/write ratio. The read/write ratio is converted to the integer values 275/620. This ratio is multiplied by the number of heads so that a full cylinder of write operations is accounted for in the total values. If only a partial cylinder was used then a skewed result would occur. The result is 4400/9920. This value is multiplied by the number of redundancy groups so that each redundancy group has at least one cylinder written. The result is 17600 read operations and 39680 write operations.

Thus the variables for this calculation are: Heads (H)=16; Redundancy Groups (RG)=4; Average Seek Time (AS)= 13.5 ms; Optimized Seek Time (OS)=12 ms; Head Select Time (HS)=0.8 ms; Read Operations (R)=17600; and Write Operations (W)=39680.

The next step is to calculate the total non-optimized seek and head select time. If R/RG is greater than or equal to W then $$Time=(T)=(R+W) \times AS$$

else $$Time=(T)=((R+R/RG+W-R/RG)/H) \times AS+((H-1)/H)(W-R/RG) \times HS$$

In this anticipated situation, R/RG=4400, which is less than 39680, so the second formula is therefore used to arrive at Time=353227.5 ms.

The next step is to calculate the total optimized seek and head select time using the formula:

$$Time=(R/RG \times AS)+(W/H+(R \times (RG-1))/RG) \times OS$$

Time=247560 ms

The next step is to calculate to percent of time saves using this formula.

$$\%=(\text{Non Opt Time}-\text{Opt Time})/\text{Non Opt Time}$$

$$\%=(353227.5-251280)/353227.5=29.9\%$$

As is demonstrated from the explanation of the calculations and the assumptions associated with this example, the calculated savings in time is 29.9%.

EXAMPLE 2

An entirely different method of calculating an anticipated improvement in performance also confirms the validity of the expected improvements available from the present invention.

The following definitions apply for this Example 2: N is the number of redundancy groups; RW is the read to write ratio as measured at the command line, meaning the ratio for read operations to write operations going to all redundancy groups, not necessarily the read/write ratio seen by any particular disk controller; TPC is the number of tracks per cylinder; $T_{random}$ is the time for a seek from any random cylinder to any other random cylinder; $T_{center}$ is the time for a seek from the center cylinder to any random cylinder; $T_{read}$ is the time required for a complete read operation; and $T_{write}$ is the time required for a complete write operation.

This example is based on a number of assumptions, explained below. The read operations are evenly (randomly) distributed across the disk drives and the redundancy groups. There is at most one read command between two write commands, meaning that RW/N<1. There are two operational modes that a particular disk controller and disk drive can occupy: a write logical cylinder is open in the redundancy group in which the disk drive resides (write pre-seek mode), or no write logical cylinder is open in the redundancy group in which the drive resides (read pre-seek mode). When a write logical cylinder is not active in a redundancy group, the disk controller and the disk drives in that redundancy group are in the read pre-seek mode. In the read pre-seek mode, all operations should be read operations because the write operations are going to another the redundancy group that has the active write logical cylinder open in it.

The time saved by read pre-seeking on each read is therefore the difference between $T_{random}$ and $T_{center}$. If $T_{random}$=13.5 ms, $T_{center}$=12 ms, and $T_{read}$=30 ms, then the percentage improvement in seeks for read operations while in read pre-seek mode is $T_{random}-T_{center}/T_{random}$=1.5/13.5= 11%. The percentage improvement in read operations while in read pre-seek mode=$T_{random}-T_{center}/T_{read}$=1.5/30=5%.

When a write logical cylinder is active in the redundancy group, the read/write ratio seen by the disk controller is RW/N since all write operations are going to the redundancy group in which the disk controller and disk drives reside, but the read operations are evenly distributed across all N redundancy groups.

The write pre-seek mode is entered when the first track of the logical cylinder is written. No write pre-seek can be accomplished for this first write operation, since there is no way of anticipating which logical cylinder will be written. Since the disk drive will be in the read pre-seek mode at the time of the first write operation, the time saved on the first write operation will be $T_{saved0}=T_{random}-T_{center}$.

On average, the number of times that a disk controller has to perform a read operation between the time when the write operation of the first track of a logical cylinder is complete and the time when the write operation of the last track of a logical cylinder is complete is RW/N×(TPC−1), regardless of whether or not the disk controller is pre-seeking. The impact of the read operations when not pre-seeking is that random seeking and head selection must be performed each time the read operation is commanded, and random seeking and head selection must be performed again when the next write command is received.

When write pre-seeking is employed, the random seeking and head selection still must be done to perform the read operation, but the random seeking and head selection to perform the next write has been saved. So the time saved in performing the write operation is $T_{saved1}$=(RW/N×(TPC− 1)×(Random Seek Time+Head Select Time). In addition, if no read operation occurred, write pre-seeking saved the head select time $T_{saved2}$=((TPC−1)−RW/N×(TPC−1))×(Head Select Time) or (1−RW/N)×(TPC−1)×(Head Select Time). The total time saved is the sum of $T_{saved0}$, $T_{saved1}$ and $T_{saved2}$, and the percent improvement can be expressed either in improved seek time or improved write time as $(T_{saved0}+T_{saved1}+T_{saved2})/(T_{random} \times TPC)$ or $(T_{saved0}+T_{saved1}+T_{saved2})/(T_{write} \times TPC)$. The TPC in the denominator of the last two equations is because the time saved is averaged over TPC write operations. If RW=2.75/6.2; N=4; TPC=19; Random Seek Time=13.5 ms; Head Select Time= 0.6 ms, then information, $T_{saved0}$=1.5 ms and $T_{saved1}$=28.3 ms. The percentage improvement on seeks on write operations is (1.5 ms+28.3 ms+12.8 ms)/(13.5×19)=16.6%. The percentage improvement on write operations is (1.5 ms+20.3 ms+12.8 ms)/30 ms×19)=7.4%.

From this Example 2, calculated differently based on a different set of factors and assumptions, the anticipated performance improvment is 7.4%, which although smaller than the anticipated performance calculated in Example 1, is still of such a magnitude to be a highly significant improvement.

Using the assumptions and the calculations set forth above in Example 1, the improvements illustrated by both Examples 1 and 2 can be generalized in the following Table. This Table summarized the anticipated improvements in relationship to the number of rendundancy groups (RG's) in the system relative to the ratio of read operations (Reads) to write operations (Writes).

|  | Percent Seek/Head Select Time Improvement | | | | | | |
|---|---|---|---|---|---|---|---|
| Reads | 1 | 1 | 1 | 1 | 2 | 4 | 8 |
| Writes | 8 | 4 | 2 | 1 | 1 | 1 | 1 |
| # of RG | | | | | | | |
| 2 | 43.06% | 38.59% | 36.88% | 35.85% | 35.28% | 23.39% | 15.46% |
| 4 | 37.51% | 23.11% | 17.07% | 13.16% | 10.91% | 25.73% | 18.00% |
| 6 | 35.35% | 23.74% | 17.81% | 13.97% | 11.76% | 10.54% | 18.81% |
| 8 | 34.20% | 24.06% | 18.18% | 14.38% | 12.19% | 10.99% | 10.36% |
| 10 | 33.49% | 24.25% | 18.41% | 14.62% | 12.44% | 11.25% | 10.63% |
| 12 | 33.00% | 24.38% | 18.56% | 14.79% | 12.61% | 11.43% | 10.82% |
| 14 | 32.65% | 24.47% | 18.66% | 14.90% | 12.73% | 11.56% | 10.95% |
| 16 | 32.38% | 24.54% | 18.74% | 14.99% | 12.83% | 11.65% | 11.04% |

As will be appreciated from these anticipated examples, system performance enhancements in the range of approximately 11% to 43% are anticipated from use of the present invention under the circumstances indicated.

From the foregoing description of the present invention, it is readily apparent that, for the first time, an effective process has been obtained for write pre-seeking the heads and for preselecting the heads, by which to reduce the time required to accomplish the write operation. In addition to the normal read pre-seeking functionality of positioning the head in the middle of all of the tracks, the improved read pre-seeking of the present invention advantageously allows the determination of an active area and positions the head in approximately the middle of the active area, thereby further reducing the amount of seek time to reach the track at which the actual read operation is commanded. Further still, the dynamic selection capabilities of enabling, disabling and bypassing write pre-seeking prohibits the write pre-seeking functionality from degrading system performance under circumstances where thrashing would occur. Many other important and significant advantages and improvements are also apparent after comprehension of the important aspects of the present invention.

Presently preferred embodiments of the present invention and many of its improvements have been described with a degree of particularity. The previous description is detailed in explaining preferred examples for implementing the present invention, but the scope of the invention is defined by the following claims not necessarily by the details of this preceding description.

The invention claimed is:

1. A process for decreasing an amount of time necessary to perform sequential read and write operations in a mass storage system having a plurality of disk drives to which the read and write operations are commanded, said process comprising the steps of:

determining from at least one write operation a characteristic uniquely defining a predetermined write algorithm used to execute a predetermined series of write operations to write a block of data to a multiplicity of different predetermined locations on at least one disk drive during execution of the write algorithm; and thereafter in response to the determination of the write algorithm and in anticipation of a next write operation to be performed in the predetermined series of write operations in accordance with the algorithm:

seeking a transducer of an individual disk drive in which the next write operation of the predetermined series is to be performed to a predetermined write pre-seek location at which the next write operation is to be performed, after performance of a previous write operation of the series and before the next write operation of the series is commanded.

2. A process as defined in claim 1 further comprising the step of:

selecting the transducer of the individual disk drive in which the next write operation of the predetermined series is to be performed after performance of the previous write operation of the series and before the next write operation is commanded.

3. A process as defined in claim 2 further comprising the step of:

seeking a transducer of an individual disk drive other than the one to which the next write operation of the predetermined series is to be performed to a predetermined read pre-seek location at which there is a probability that a distance from the predetermined read pre-seek location to an actual location of a next read operation is reduced.

4. A process as defined in claim 2 further comprising the step of:

determining with each one of the immediately previously performed read and write operations whether to seek the transducer to the predetermined write pre-seek location.

5. A process as defined in claim 4 wherein the step of determining whether to seek the transducer to the predetermined write pre-seek location further comprises:

evaluating a frequency of read and write operations commanded to the disk drive to which the next write operation is to be commanded.

6. A process as defined in claim 5 wherein the evaluating step further comprises:

determining an average time between sequential read and write operations commanded to the disk drive to which the next write operation is to be commanded, over a predetermined number of previous sequential read and write operations;

comparing the average time to a threshold time limit; and not seeking the transducer to the predetermined write pre-seek location when the average time falls below the threshold time limit.

7. A process as defined in claim 4 wherein the step of determining whether to seek the transducer to the predetermined write pre-seek location further comprises the step of:

determining from the predetermined location to which an immediately previous write operation was commanded, the characteristic of the write algorithm.

8. A process as defined in claim 7 wherein the predetermined location to which the immediately previous write operation was commanded is a unique location to which the first of the series of write operations for the block of data is commanded.

9. A process as defined in claim 4 wherein the step of determining whether to seek the transducer to the predetermined write pre-seek location further comprises:

determining from at least two predetermined locations to which two sequential write operations are respectively commanded, the characteristic of the write algorithm.

10. A process as defined in claim 2 further comprising the step of:

seeking a transducer of an individual disk drive other than the one to which the next write operation of the predetermined series is to be performed to a predetermined read pre-seek location at which there is a probability that a distance from the read pre-seek location to an actual location of a next read operation is reduced.

11. A process as defined in claim 10 wherein the predetermined read pre-seek location is within a predetermined range of active locations to which a predetermined number of previous read operations have been commanded.

12. A process as defined in claim 11 wherein each of the predetermined locations to which a read operation is commanded has a unique number, and further comprising the step of:

determining the predetermined range of active locations by averaging the unique numbers of the predetermined locations to which each of the predetermined number of previous read operations have been commanded.

13. A process as defined in claim 3 further comprising the step of:

bypassing the step of seeking the transducer to the write pre-seek location if a ratio of read operations to write operations during a predetermined number of previous sequential read and write operations exceeds a predetermined ratio.

14. A process as defined in claim 13 further comprising the step of:

determining the ratio of read operations to write operations by counting the number of one of the read and write operations since an occurrence of the other one of the read and write operations, and comparing the number to a threshold.

15. A process as defined in claim 3 for use in a RAID mass storage system.

16. A process as defined in claim 15 wherein the plurality of disk drives are divided into a plurality of redundancy groups, each redundancy group includes a plurality of disk drives, and the redundancy groups are connected to an array controller, and further comprising:

commanding write and read operations from the array controller;

distributing write operations approximately equally to all of the redundancy groups; and commanding write operations within only one redundancy group at a time to write a block of data to the disk drives of one redundancy group.

17. A process as defined in claim 16 wherein each redundancy group includes a disk controller to control read and write operations to each disk drive in the redundancy group, and wherein the steps of determining the characteristic, seeking the transducer to the predetermined write pre-seek location, and selecting the transducer are accomplished by the disk controller.

18. A process as defined in claim 16 further comprising the step of:

seeking the transducer to the predetermined read pre-seek location on all of the disk drives of all redundancy groups other than the one redundancy group within which write operations are commanded.

19. A process as defined in claim 18 wherein the predetermined locations to which data is written are tracks on the disk drives, and the write algorithm is a log structure file algorithm in which the block of data is written to all tracks in sequence of a logical cylinder defined by all of the disk drives in one redundancy group.

20. A process as defined in claim 16 wherein the array controller includes a cache memory.

21. A process as defined in claim 2 wherein the write algorithm is a log structure file algorithm.

22. A process as defined in claim 2 wherein each disk drive includes a reserved area in which to contain control information, and further comprising the steps of:

determining from each immediately previously performed read and write operation whether to seek the transducer to the predetermined write pre-seek location; and continuing to seek the transducer to the predetermined write pre-seek location after determining the characteristic of the write algorithm, even if an immediately preceding write operation was to the reserved area.

23. A process for decreasing an amount of time necessary to perform sequential read and write operations in a RAID mass storage system, the RAID mass storage system including a plurality of redundancy groups, each redundancy group including a plurality of disk drives, a separate disk controller connected to each disk drive, and an array controller connected to each of the disk controllers, said process comprising:

commanding write and read operations from the array controller to each redundancy group;

distributing write operations substantially equally to all of the redundancy groups;

commanding write operations within only one redundancy group at a time to write a block of data to the disk drives of that one redundancy group;

controlling the read and write operations to and from the disk drives in each redundancy group from the connected disk controllers;

determining from at least one write operation at a disk controller a characteristic uniquely defining a predetermined write algorithm used to execute a predetermined series of write operations to write a block of data to a multiplicity of different predetermined locations on the disk drives of the one redundancy group; and thereafter in response to the determination of the write algorithm and by using the disk controllers of the one redundancy group to which the write operations are anticipated to be directed in accordance with the write algorithm:

seeking a transducer of each disk drive of the one redundancy group to a predetermined write pre-seek location at which a next write operation of the predetermined series is to be performed; and selecting the transducer of each disk drive in that one redundancy group for the next write operation of the predetermined series after performance of a previous write operation of the series and before the next write operation is commanded.

24. A process as defined in claim 23 comprising the step of:

seeking a transducer of each disk drive other than those of the one redundancy group to a predetermined read pre-seek location at which there is a probability that a distance from the read pre-seek location to an actual location of a next read operation is reduced.

25. A process as defined in claim 24 wherein the disk controllers of the one redundancy group further perform steps comprising:

determining with each immediately previously performed read and write operation whether to seek the transducer to the predetermined write pre-seek location.

26. A process as defined in claim 24 wherein the predetermined locations to which data is written are tracks on the disk drives, and the write algorithm is a log structure file algorithm in which the block of data is written to all tracks of a logical cylinder in an order defined by all of the disk drives in a redundancy group.

27. A process for decreasing an amount of time necessary to perform sequential read and write operations in a mass storage system having a plurality of disk drives to which the read and write operations are commanded, said process comprising the steps of:

seeking a transducer of an individual disk drive to a predetermined read pre-seek location at which there is a probability that a distance from the read pre-seek location to an actual location of a next read operation is reduced;

determining from a predetermined number of immediately previously performed read operations a predetermined range of active locations at which the predetermined number of previous read operations were commanded; and locating the predetermined read pre-seek location at a location approximately midway within the range of active locations.

28. A process as defined in claim 27 wherein each of the predetermined locations to which read and write operations are commanded has a unique number, and further comprising the steps of:

determining the predetermined range of active locations by averaging the unique numbers of the predetermined locations of each of the predetermined number of previous read operations which have been commanded.

29. A process for decreasing an amount of time necessary to perform sequential read and write operations in a mass storage system having a plurality of disk drives to which the read and write operations are commanded, write operation whether to seek a transducer of an individual said process comprising the steps of:

determining from each previous read and disk drive to a predetermined write pre-seek location at which a next write operation of a predetermined series of write operations is to be performed, said predetermined series of write operations defining a write algorithm used to write a block of data to a multiplicity of different locations of a plurality of disk drives;

seeking the transducer to the predetermined write pre-seek location after performance of a previous write operation of the series and before the next write operation is commanded, when the determination is made to seek the transducer to the predetermined write pre-seek location; and seeking the transducer to a predetermined read pre-seek location at which there is a probability that a distance from the read pre-seek location to an actual location of a next read operation is reduced, when the determination is made not to seek the transducer to the predetermined write pre-seek location.

30. A process as defined in claim 29 further comprising the step of:

selecting the transducer of the individual disk drive to which the next write operation of the predetermined series is to be performed, after performance of the previous write operation of the series and before the next write operation is commanded, when the determination is made to seek the transducer to the predetermined write pre-seek location.

31. A process as defined in claim 29 wherein:

the determination is made not to seek the transducer to the predetermined write pre-seek location when a ratio of read operations to write operations commanded during a predetermined number of previous sequential read and write operations exceeds a predetermined ratio.

32. A process as defined in claim 29 wherein:

the determination is made not to seek the transducer to the predetermined write pre-seek location when the immediately previous write operation commanded is not consistent with the location to which a write operation of the predetermined series would have been directed in compliance with the write algorithm.

33. A process for decreasing an amount of time necessary to perform sequential read and write operations in a mass storage system having a plurality of disk drives to which the read and write operations are commanded, said process comprising the steps of:

determining from at least one write operation a characteristic uniquely defining a predetermined write algorithm which defines a predetermined series of write operations used to write a block of data to a multiplicity of different predetermined locations on at least one disk drive during execution of the write algorithm; and thereafter in response to the determination of the write algorithm:

selecting a transducer of the one disk drive to which a next write operation of the predetermined series is to be performed, after performance of a previous write operation of the series and before the next write operation is commanded.

* * * * *